United States Patent
Parshin et al.

(10) Patent No.: US 10,892,836 B2
(45) Date of Patent: *Jan. 12, 2021

(54) AUTOMATED RFID TAG PROFILING AT APPLICATION

(71) Applicant: Amazon Technologies, Inc., Seattle, WA (US)

(72) Inventors: Sergey Parshin, Redcliffe (AU); Jon R. Ducrou, West End (AU); Ryan David Hapgood, Belmont (AU); Jeanette Rogers, Mount Gravatt East (AU); Uladzimir Silchanka, Boondall (AU); Shanmugarajan Muthu Pandian, Greenslopes (AU); Matthew Lake, The Gap (AU); Bradley Nathaniel Gray, Auchenflower (AU); Yeyang Yu, Logan Central (AU)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/738,732

(22) Filed: Jan. 9, 2020

(65) Prior Publication Data
US 2020/0313781 A1 Oct. 1, 2020

Related U.S. Application Data

(63) Continuation of application No. 16/369,638, filed on Mar. 29, 2019, now Pat. No. 10,541,764.

(51) Int. Cl.
*H04B 17/391* (2015.01)
*G06K 7/00* (2006.01)
*G06K 7/10* (2006.01)

(52) U.S. Cl.
CPC ......... *H04B 17/391* (2015.01); *G06K 7/0095* (2013.01); *G06K 7/10019* (2013.01)

(58) Field of Classification Search
CPC . H04B 17/391; G06K 7/0095; G06K 7/10019
See application file for complete search history.

(56) References Cited

U.S. PATENT DOCUMENTS

| | | | | |
|---|---|---|---|---|
| 8,078,139 | B2* | 12/2011 | Twitchell, Jr. | H04W 48/08 455/404.2 |
| 9,846,854 | B1* | 12/2017 | Lee | G06Q 10/087 |
| 9,858,523 | B2* | 1/2018 | Linkesch | G06K 19/07722 |
| 2004/0169587 | A1* | 9/2004 | Washington | G08B 13/2462 340/573.1 |
| 2006/0212164 | A1* | 9/2006 | Abraham, Jr. | G06K 17/00 700/215 |

(Continued)

*Primary Examiner* — David Bilodeau
(74) *Attorney, Agent, or Firm* — Patterson + Sheridan, LLP

(57) ABSTRACT

A system that performs self-diagnosing of unreliable radio frequency identification (RFID) tags in a first location within an environment includes an RFID printer that prints RFID tags in the first location and RFID antennas located at different distances to the first location. The system obtains, for each RFID tag, a first set of RFID parameters of the RFID tag for each RFID antenna when the RFID tag is in the first location. The system generates, for each RFID tag, a model of RFID tag behavior over different distances to an RFID antenna, based at least in part on the first set of RFID parameters obtained for the RFID tag.

20 Claims, 7 Drawing Sheets

(56) References Cited

U.S. PATENT DOCUMENTS

| | | | | |
|---|---|---|---|---|
| 2007/0008120 | A1* | 1/2007 | Smith | G06Q 10/06 |
| | | | | 340/539.26 |
| 2007/0109100 | A1* | 5/2007 | Jett | G06K 7/10366 |
| | | | | 340/10.4 |
| 2008/0114487 | A1* | 5/2008 | Schuler | G06Q 10/06 |
| | | | | 700/217 |
| 2008/0297322 | A1* | 12/2008 | Krener | G06Q 10/087 |
| | | | | 340/10.4 |
| 2009/0303004 | A1* | 12/2009 | Tuttle | G01S 13/756 |
| | | | | 340/10.1 |
| 2010/0007470 | A1* | 1/2010 | Twitchell, Jr. | G06Q 30/0241 |
| | | | | 340/10.1 |
| 2017/0061171 | A1* | 3/2017 | Lombardi | G06K 7/10019 |

\* cited by examiner

AUTOMATED RFID TAG PROFILING AT APPLICATION

CROSS-REFERENCE TO RELATED APPLICATION

This application is a continuation of co-pending U.S. patent application Ser. No. 16/369,638, filed Mar. 29, 2019. The aforementioned related patent application is herein incorporated by reference in its entirety.

BACKGROUND

Retailers, wholesalers, and other product distributors typically maintain an inventory of various items that may be ordered, leased, borrowed, rented, viewed, and so forth, by clients or customers. For example, an e-commerce website may maintain inventory in a fulfillment center. When a customer orders an item, the item is picked from inventory, routed to a packing station, packed, and shipped to the customer. In some cases, an associate may manually place an item(s) in a staging area as part of a production distribution workflow. For example, the staging area can include locations for holding pre-assembled customer orders before the orders are delivered to the customer.

In some cases, a retailer (or product distributors) can use a radio frequency identification (RFID) system to track items in a staging area. In these RFID systems, an RFID tag can be disposed on an item and programmed with information identifying the associated item. RFID systems can attempt to locate the item in the staging area based on reading the identifying information from the RFID tag. RFID systems typically require an associate to manually place the RFID tag on the item and associate the RFID tag with the item (e.g., by scanning a barcode on the item) before placing the item in the staging area. Moreover, once an associate places the item in its destination location, conventional RFID systems may again require the associate to enter information associated with the destination location (e.g., by scanning a barcode associated with a particular location in the staging area). Each of these manual transactions can impact the properties of an RFID tag, which in turn, can affect the accuracy of tracking a given item that includes the RFID tag.

BRIEF DESCRIPTION OF DRAWINGS

Various embodiments in accordance with the present disclosure will be described with reference to the drawings, where like designations denote like elements.

DETAILED DESCRIPTION

Figure 1:
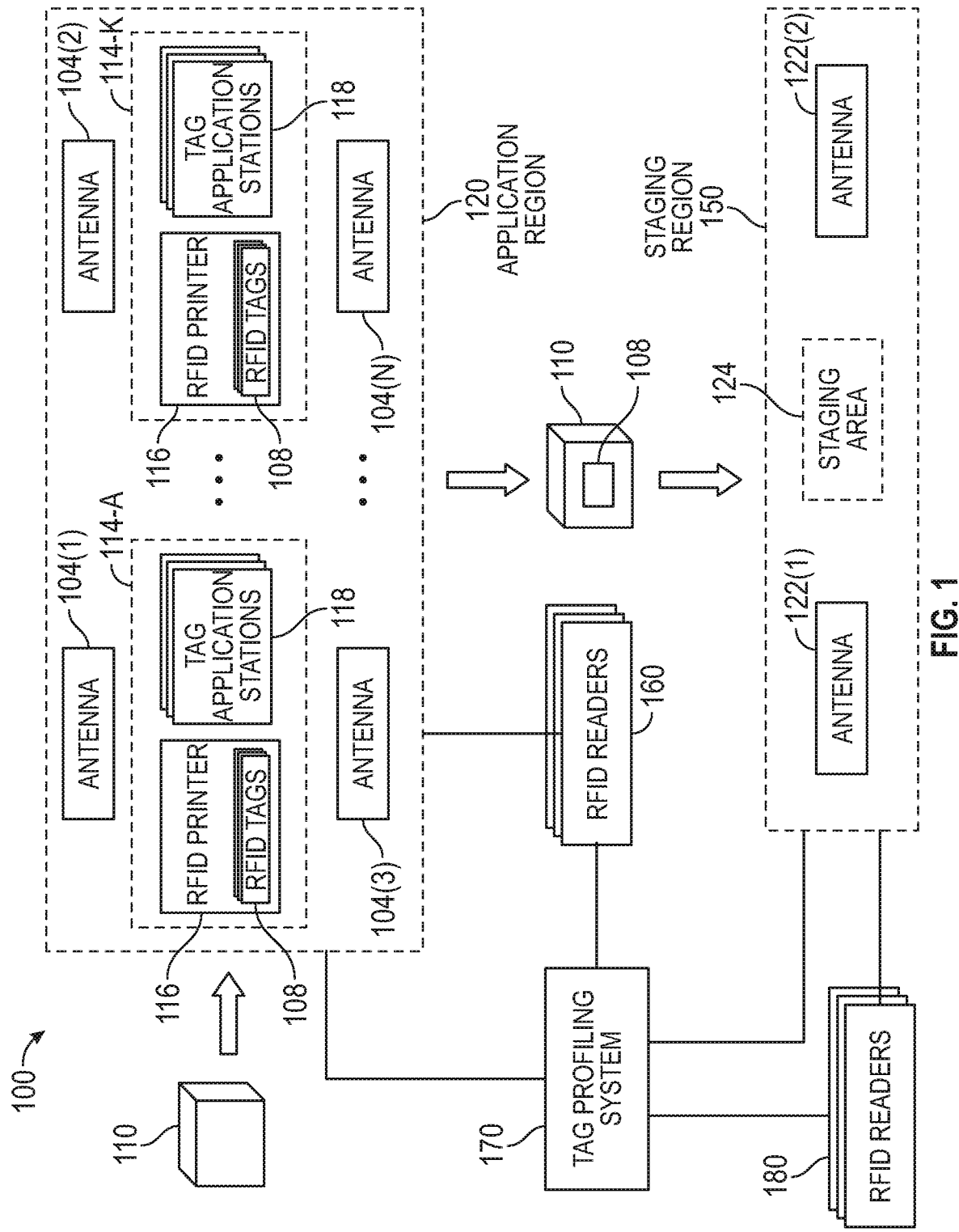
FIG. 1 is a block diagram illustrating an inventory system with an RFID tag application area, according to one embodiment.

Embodiments presented herein describe an RFID tag profiling system that monitors an RFID tag printing and application area (also referred to herein as an "RFID tag area") in order to self-diagnose (or identify) unreliable RFID tags that may be applied to items or packages. The RFID tag area, for example, may be a designated area within a facility (e.g., fulfillment center) for printing (via an RFID tag printer) RFID tags and applying the RFID tags to packages. The RFID tag area may include one or more pre-configured areas where RFID tags are located during the RFID tag printing and application workflow. For example, the RFID tag area may include a pre-configured (first) location (or position) for an RFID printer to output one or more RFID tags and one or more pre-configured (second) locations designated for applying (or labeling) the RFID tags to packages. In one embodiment, the RFID tag profiling system includes one or more RFID antennas deployed in different locations (or positions) in proximity to the RFID tag area and an RFID reader(s) coupled to the RFID antenna(s). The RFID antenna(s) can be deployed at different (pre-configured) distances to the RFID tag area and/or at different (pre-configured) orientations (e.g., directions) with respect to the RFID tag area.

The RFID tag profiling system uses the RFID reader(s) (and RFID antenna(s)) to build a model of RFID tag behavior for each RFID tag that is output from the RFID printer in the RFID tag area. In one embodiment, the RFID tag profiling system generates the model for each RFID tag based on the RFID tag parameters obtained for the RFID tag from each of the RFID antennas at the different locations. In some examples, the RFID tag parameters can include a signal strength (e.g., relative signal strength indication (RSSI)) of a signal received from the RFID tag (e.g., in response to a query or interrogation by an RFID reader), a response rate of the RFID tag to requests (or interrogations) from an RFID reader, etc. Assuming these parameters are obtained, the model for a given RFID tag may indicate the RSSI behavior of the RFID tag for different distances to an RFID antenna and the response rate behavior of the RFID tag for different distances to an RFID antenna.

The RFID tag profiling system can use the generated model for each RFID tag to determine whether the RFID tag is unreliable and should be replaced (e.g., by an operator or associate). In one embodiment, the RFID tag profiling system may determine that a difference between the (first) RFID tag parameters of the RFID tag (e.g., obtained from the generated model of the RFID tag) and (second) RFID tag parameters associated with a type of the RFID tag (e.g., obtained from a model of the RFID tag's family) satisfies a predetermined condition (e.g., is greater than a threshold difference, is greater than or equal to a threshold difference, is outside of a threshold range, etc.). After such a determination, the RFID tag profiling system can mark the RFID tag for replacement, e.g., to alert an associate to discard the RFID tag and replace the RFID tag with another RFID tag. In some cases, the RFID tag profiling system can mark the RFID tag for replacement before the RFID tag is applied (e.g., as a label) to a package. In this manner, the RFID tag profiling system can self-diagnose unreliable RFID tags present in the RFID tag area, e.g., to prevent the unreliable RFID tags from impacting subsequent processes within the facility that may attempt to use the RFID tag (e.g., for tracking/localization).

Additionally or alternatively, in some embodiments, the RFID tag profiling system can use the generated model for each RFID tag to more accurately calibrate (or account) for variations in the RFID tag's signal when it is detected in another location (e.g., staging area) within a facility. For example, after an RFID tag is printed and encoded with identifying information in the RFID tag area, the RFID tag may be applied (or affixed) to a package and associated with the package. The RFID tagged package may be transitioned to a staging area having multiple storage locations for temporarily holding various inventory items (e.g., packages, bags, totes, individual items, etc.). The RFID tagged package may be tracked within the staging area based at least in part on its RFID tag. In some cases, however, the RFID parameters from the RFID tagged package may be susceptible to environmental and atmospheric conditions that include, but are not limited to, noise, interference (e.g., interference from other RFID tags), attenuation from nearby objects, radio signal multi-path, reflection, refraction, diffraction, absorption, polarization, scattering, etc. Conventional RFID systems generally do not have an understanding (or knowledge) of how a given RFID tag on a package behaves in different scenarios. Consequently, in conventional RFID systems, these environmental and atmospheric conditions can severely degrade the efficiency and accuracy of locating the RFID tagged package based on its RFID tag.

To address the above, the RFID tag profiling system can use the generated model for a given RFID tag (e.g., generated when the RFID tag was in the RFID tag area) to determine whether the variations detected in the RFID tag's parameters (when the RFID tag is in the same and/or different location) are consistent with the RFID tag's behavior or are due, in part, to environment and atmospheric conditions at the location of the RFID tag. By accounting for variations in the RFID tag's parameters in this manner, embodiments can achieve a higher precision when tracking the RFID tagged package in the different location, relative to conventional RFID tag localization techniques.

In some embodiments, the RFID tag profiling system can use the generated model for a given RFID tag to predict (or determine) whether at least one condition of a package associated with the RFID tag has occurred. In many cases, an item that is tagged with an RFID tag may experience numerous transactions within the facility, e.g., from a (first) time when the RFID tag is transitioned to the RFID tag area, to a (second) time when the RFID tag is printed, to a (third) time when the RFID tag is applied to a package, to a (fourth) time when the RFID tag is detected within a different location (e.g., staging area) within the facility, and so on. In general, the RFID tag may experience numerous transitions and/or transactions (or may be physically impacted) during various stages during a workflow. These numerous transactions can increase the likelihood that the RFID tag will be damaged, misplaced, tampered with, etc. (e.g., by the time the package is placed in the different location). To address this issue, the RFID tag profiling system can determine whether at least one of: (i) the package has been misplaced (e.g., the package is not detected within a threshold amount of time after the package is transitioned away from the RFID tag area), and (ii) the package has been tampered with or damaged (e.g., a difference between the RFID tag's parameters when the package is in the RFID tag area and the RFID tag's parameters for that type (or family) of RFID tag satisfies a predetermined condition, such as the difference is greater than a threshold).

FIG. 1 is a block diagram illustrating an inventory system 100 having multiple RFID tag areas 114 A-K for printing and applying (or labeling) RFID tags to packages, according to one embodiment. The inventory system 100 may be arranged in a facility, warehouse (e.g., distribution facility, fulfillment center), retail store, etc. The inventory system 100 may be logically organized into areas or regions associated with various functions (e.g., storage, picking, fulfillment, etc.). In the depicted example, the inventory system 100 includes an application region 120 and a staging region 150. An associate may receive items or packages in the application region 120, print RFID tags for the packages using an RFID printer, apply RFID tags to the packages, and place the packages into the staging area 124. In practice, depending on the size of the inventory system 100, the facility or warehouse may hold more than one of the staging region 150 or the warehouse may be configured without the staging region 150. Similarly, depending on the size of the inventory system 100, the facility or warehouse may hold more than one of the RFID tag areas 114 A-K.

The application region 120 includes one or more RFID tag areas 114 A-K for printing and applying RFID tags to packages. As shown, each RFID tag area 114 A-K includes an RFID printer 116, which includes multiple RFID tags 108, and one or more RFID tag application stations 118 designated for applying RFID tags 108 output from the RFID printer 116 to packages. The RFID printer 116 and RFID tag application station(s) 118 may have pre-configured locations within the respective RFID tag area 114. In some embodiments, each RFID tag application station 118 may correspond to a designated area of an associate that is responsible for applying RFID tags 108 to packages. Note that the RFID printer 116 and RFID tag application stations 118 are depicted as reference examples of pre-configured locations where RFID tags may be located within the application region 120. In other embodiments, RFID tags 108 can be in other (pre-configured) locations (e.g., storage location, inventory area, unloading dock, etc.) within the application region 120 and/or the facility.

In one embodiment, the RFID tags 108 may be blank RFID tags (e.g., without any identifying information encoded on the RFID tags). In one embodiment, the RFID tags 108 may be pre-configured with identifying information. The RFID printer 116 can be configured to receive any material that is sufficient to enable the RFID printer 116 to print an RFID tag 108 on the material and encode (assuming it's not a pre-configured RFID tag) identifying information on the RFID tag 108. In one embodiment, the material can include one or more rolls of ribbon, each including at least one of a wax and resin material.

The application region 120 also includes one or more RFID antennas 104 deployed in various locations around (e.g., in proximity to) the RFID tag areas 114 A-K for reading RFID tags 108. In one embodiment, the RFID antennas 104(1)-(N) may be deployed at different distances to the RFID tag areas 114 A-K, e.g., to enable the RFID tag profiling system 170 to build a model of the RFID tag's behavior at different distances to an RFID antenna. In one embodiment, at least one of the RFID antennas 104(1)-(N) may be deployed at the same distance (but different location or position) to an RFID tag area 114 as another of the RFID antennas 104 (1)-(N). For example, RFID antenna 104(1) and RFID antenna 104(3) may be deployed at different locations (e.g. different (x,y,z) coordinates), but be at the same distance (e.g., three dimensional (3D) Euclidean distance) to the RFID tag area 114-A. In some embodiments, an RFID antenna 104 location may correspond to a physical position (e.g., physical (x, y, z) coordinate) and/or a simulated position (e.g., through the use of one or more attenuators). For example, one or more attenuators can be deployed within the application region 120 to simulate the position of an RFID antenna 104 by attenuating the strength of a signal detected by the RFID antenna 104. In this embodiment, a single RFID antenna 104 can be used to simulate one or more RFID antenna locations, which can be used to generate the model for each RFID tag.

In some embodiments, the model for each RFID tag 108 may be a curve of the RFID tag's RSSI vs. distance to an RFID antenna, a curve of the RFID tag's response rate vs. distance to an RFID antenna, etc. The RFID tags 108 may include passive RFID tags or active RFID tags. Here, the RFID antennas 104 are coupled to one or more RFID readers 160, which read the RFID tags 108. In one embodiment, each RFID antenna 104 is coupled to a single RFID reader 160. In one embodiment, an RFID reader 160 can be coupled to more than one RFID antenna 104. The number of RFID antennas 104 in proximity to an RFID tag area 114 may be based on a prior (off-line) evaluation of the number of RFID antennas that is sufficient to enable the inventory system 100 to build a model of RFID tag behavior for RFID tags in the RFID tag area 114. Similarly, the RFID antennas 104 may be distributed (e.g., with different locations and/or orientations) across an RFID tag area 114 in any manner sufficient to enable the inventory system 100 to determine the location of packages in the staging area 124, based on a prior (off-line) evaluation.

One or more of the RFID tag areas 114 A-K may be implemented as a physical structure (e.g., table, flat surface) to accommodate various items, such as the RFID printer 116, at least one package, etc., and one or more RFID tag application stations 118. The RFID tag area 114 may have a physical length, width, and height that may be standardized or varied within the inventory system 100. In one embodiment, the RFID tag areas 114 A-K can include a defined region on the floor of the facility. For example, tape or paint may be used to define the boundaries of the RFID tag area(s) 114 A-K. In one implementation, an RFID tag area 114 can include one or more tables that provide a flat surface for handling various items. One example of an RFID tag area 114 that is implemented as a flat surface is described in more detail with reference to FIG. 2. In general, the RFID tag area 114 can be any suitable apparatus with a form factor for holding multiple various items (e.g., packages, bins, totes, RFID printers, RFID tags, etc.).

The inventory system 100 includes a staging region 150, which includes one or more staging areas 124 for storing pre-assembled customer items orders. In one embodiment (not shown in FIG. 1), the staging area 124 may include multiple storage locations for storing various items. The staging region 150 also includes one or more RFID antennas 122(1) and 122(2) deployed in various locations (or positions) around (e.g., in proximity to) the staging area(s) 124 for reading reference RFID tags (not shown) and RFID tagged packages (e.g., RFID tag 108 on package 110). The RFID tagged packages 110 may include passive RFID tags or active RFID tags. A staging area 124 may be deployed with any number of RFID antennas 122 sufficient to enable the inventory system 100 to determine the location of packages in the staging area 124. Similarly, the RFID antennas 122 may be distributed (e.g., with different locations and/or orientations) across a staging area 124 in any manner sufficient to enable the inventory system 100 to determine the location of packages in the staging area 124. The RFID antennas 122 are coupled to one or more RFID readers 180. In one embodiment, each RFID antenna 122 is coupled to a single RFID reader 180. In one embodiment, an RFID reader 180 can be coupled to more than one RFID antenna 122.

One or more of the staging areas 124 may be implemented as a physical structure (e.g., frame) to hold various items. The staging area 124 may have a physical length, width, and height that may be standardized or varied within the inventory system 100. As used herein, the staging area(s) 124 may be configured to hold various types and sizes of items. In one embodiment, the staging area(s) 124 can include a defined region on the floor of the facility. For example, tape or paint may be used to define the boundaries of the staging area(s) 124, which the associate can use when placing items. In one implementation, a staging area 124 may be formed as a rack having multiple shelves to support various types of inventory items. For example, the staging area 124 can include a shelving frame with multiple rows and columns arranged in a grid to form multiple storage locations. In another example, a staging area 124 can include a shelving frame with a single row or a single column. In general, the staging area 124 can be any suitable apparatus with a form factor for holding multiple various items (e.g., packages, bins, totes, etc.).

The inventory system 100 includes a tag profiling system 170 that performs a self-diagnostic procedure in the application region 120 to identify unreliable RFID tags that may be applied to packages. As shown, a package 110 may enter the application region 120 and be directed to one of the RFID tag areas 114 A-K. Within a given RFID tag area 114, an RFID tag 108 may be printed and encoded with identifying information (e.g., a label ID, label UPC, etc.) using an RFID printer 116.

After an RFID tag 108 is printed, the RFID tag 108 may be associated with a particular package 110 and brought to one of the RFID tag application station(s) 118. In some embodiments, the RFID tag 108 may be manually associated with the package (e.g., by an associate scanning the RFID tag prior to or after applying the RFID tag to the package). In some embodiments, the tag profiling system 170 may use at least one of the RFID antennas 104 in the RFID tag area 114 to associate an RFID tag 108 with a package 110. For example, each RFID tag area 114 A-K may have at least one of the RFID antennas 104 deployed underneath (or in close proximity to) the RFID tag area 114 for detecting when an RFID tag 108 is output from the RFID printer 116. In this example, when an associate requests an RFID tag(s) 108 (e.g., from the RFID printer 116), the tag profiling system 170 can automatically associate the next package 110 in the associate's queue (or workflow) with the RFID tag 108 that is detected at the RFID tag area 114 (e.g., RFID tag application station 118) where the associate is located. In this manner, embodiments can automatically associate items with RFID tags without requiring associates to manually scan barcodes in order to associate the items with RFID tags.

The tag profiling system 170 monitors each RFID tag 108 in the RFID tag area 114 (e.g., using the RFID antennas 104) as the RFID tag 108 is output from the RFID printer 116 and applied to a package 110. Based on the monitoring, the tag profiling system 170 obtains one or more RFID parameters (e.g., signal strength, response rate, etc.) at different distances to an RFID antenna 104. The tag profiling system 170 uses the obtained RFID parameters to generate a model (e.g., build a curve) indicating a relationship between the one or more RFID parameters of the RFID tag 108 in relation to distance of that RFID tag 108 to an RFID antenna 104. In one embodiment, the tag profiling system 170 can use the generated model to determine whether an RFID tag 108 that is output from the RFID printer 116 is unreliable. In one embodiment, the tag profiling system 170 can use the generated model to aid in tracking a package 110 having the RFID tag 108, when the package 110 is in another location (e.g., staging area 124) within the inventory system 100. In one embodiment, the tag profiling system 170 can use the generated model to determine at least one condition of a package 110 having the RFID tag 108, when the package 110 is in another location (e.g., staging area 124) within the inventory system 100. For example, as noted, the tag profiling system 170 may determine whether the package 110 has been misplaced, tampered with, damaged, etc., since transitioning away from the application region 120.

Note that FIG. 1 illustrates a reference example of an environment in which the techniques presented herein for performing self-diagnostics can be used. In other embodiments, the techniques presented herein can be used in other configurations of the inventory system 100.

Figure 2:
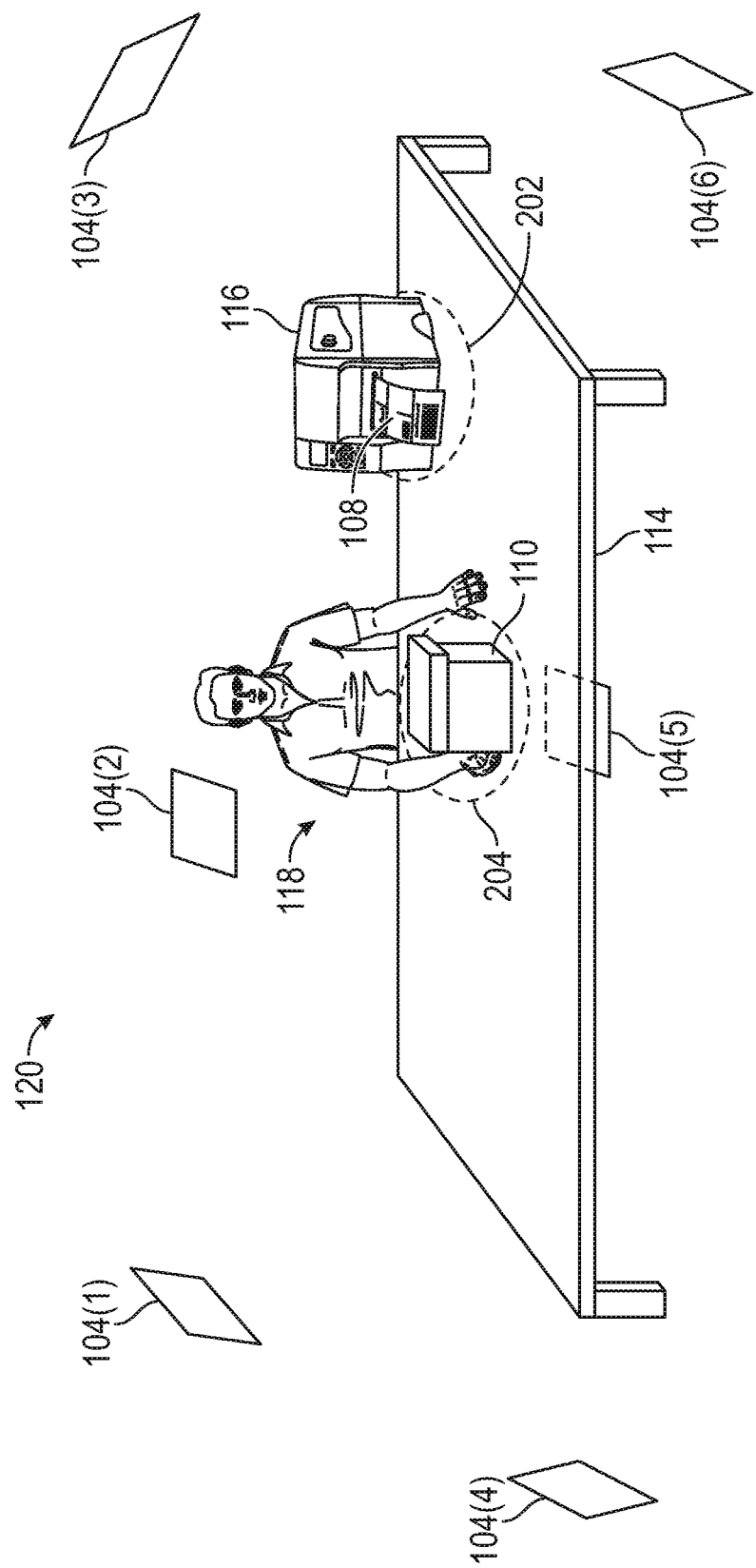
FIG. 2 depicts an example implementation of an RFID tag application area, according to one embodiment.

FIG. 2 depicts an example implementation of an RFID tag area 114 within an application region 120, according to one embodiment. In this example, the RFID tag area 114 is implemented as a table for holding various items, such as RFID printer 116, RFID tag(s) 108, package(s) 110, etc. The RFID tag area 114 includes a pre-configured (first) location 202 for the RFID printer 116, and a pre-configured (second) location 204 for the RFID tag application station 118. Note, however, that the depicted RFID tag area 114 is provided as a reference example of an RFID tag area 114. In other embodiments, the RFID tag area 114 may be designed with other configurations or form factors. For example, while the RFID tag area 114 is depicted with two pre-configured locations 202 and 204, in some embodiments, the RFID tag area 114 can include other pre-configured locations (e.g., storage locations, unloading dock, etc.) for RFID tags 108. In general, any location within the RFID tag area 114 in which RFID tags are located may be designated as a pre-configured location for RFID tags 108.

As shown in this example, RFID antennas 104(1)-(6) are deployed at various locations and various orientations (e.g., antenna directions) in proximity to the RFID tag area 114. In one embodiment, one or more of the RFID antennas 104 (1)-(6) may be deployed at a different distance (e.g., Euclidean distance in three-dimensional (3D) space) to the RFID tag area 114. In one embodiment, each of the RFID antennas 104(1)-(6) may be deployed at a different distance to the RFID tag area 114. Each of the RFID antennas 104(1)-(6) within RFID tag area 114 has a pre-configured location (e.g., a physical (x,y,z) position). Embodiments herein use the pre-configured locations of the RFID antennas 104(1)-(6) and the first and second locations 202, 204 within an RFID tag area 114 to build a model of each RFID tag's behavior at different distances to an RFID antenna 104. This, in turn, enables the tag profiling system 170 to aid in tracking an RFID tagged package, when the package is detected (e.g., by one or more RFID antennas 122) in another location (e.g., staging area 124). Note that the RFID antennas 104(1)-(6) depicted in FIG. 2 are shown merely for ease of illustration and that one or more RFID antennas can be deployed in other locations and other orientations.

Figure 3:
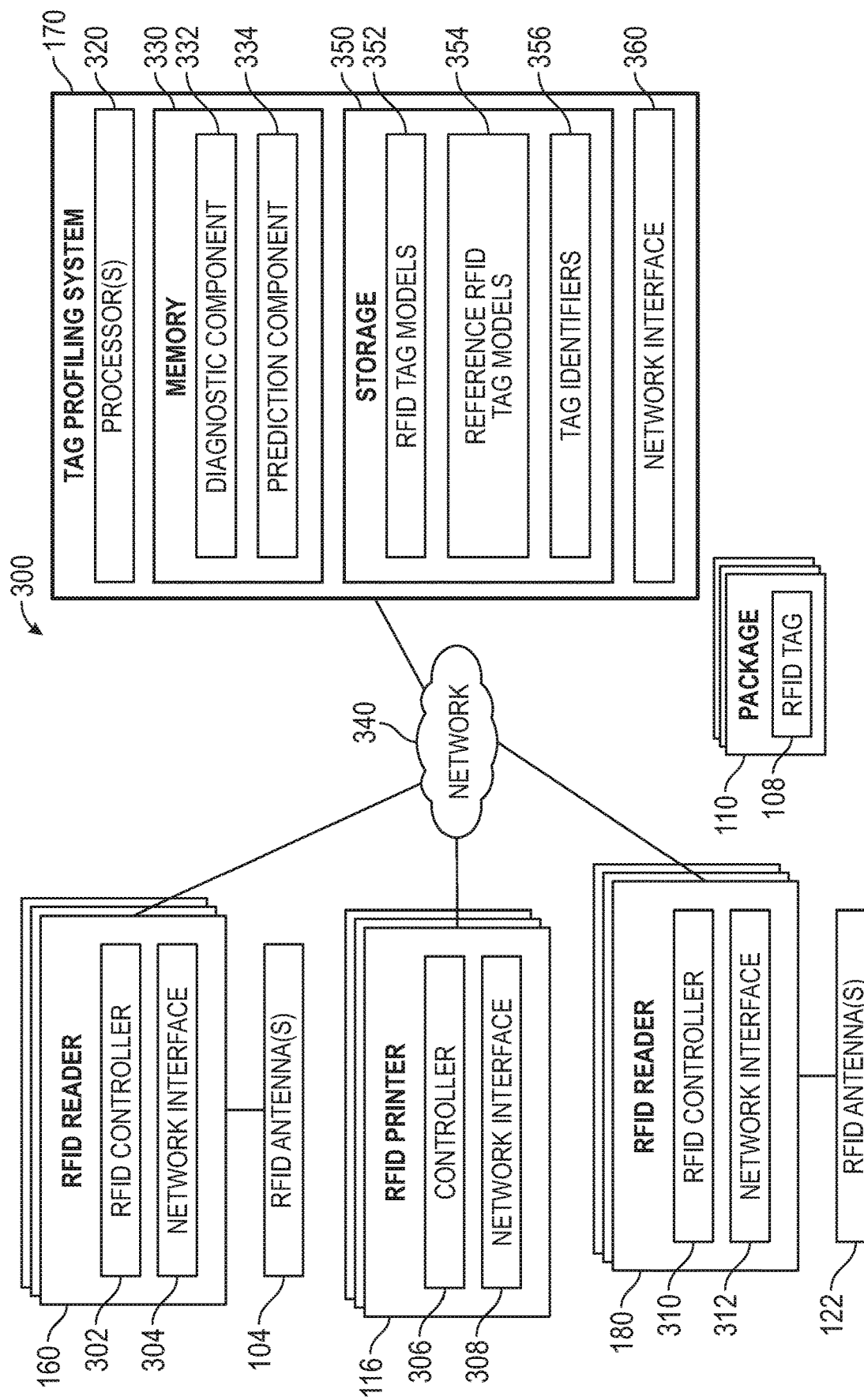
FIG. 3 is a block diagram of a system that self-diagnoses unreliable RFID tags in an RFID tag area, according to one embodiment.

FIG. 3 is a block diagram of a system 300 that monitors an RFID tag area 114, e.g., for defective RFID tags that may be applied to packages, according to one embodiment. In one embodiment, the system 300 may be implemented as part of the inventory system 100 depicted in FIG. 1. The system 300 includes a tag profiling system 170, one or more RFID readers 160, one or more RFID readers 180, and one or more RFID printers 116, which are interconnected via a network 340. The tag profiling system 170 is representative of a variety of computing devices (or systems), including a laptop computer, mobile computer (e.g., a tablet or a smartphone), server, etc. The network 340, in general, may be a wide area network (WAN), a local area network (LAN), a wireless LAN, a personal area network (PAN), a cellular network, etc. In a particular environment, the network 340 is the Internet.

The RFID printer(s) 116 includes a controller 306, which can include hardware components, software modules, or combinations thereof, and a network interface 308. The controller 306 controls the operation of the RFID printer 116. For example, the controller 306 can configure the number of RFID tags 108 to be printed (output) from the RFID printer 116, the information that is encoded on the RFID tags 108, printing resolution, etc. In one embodiment, the RFID printer(s) 116 may include a user interface (not shown) that allows a user to interact with the controller 306. The controller 306 is also communicatively coupled to the tag profiling system 170, e.g., via the network interface 308. In one embodiment, the controller 306 performs an RFID tag print job, based on a request received from an associate or via another computing system (e.g., via network interface 308).

The RFID reader(s) 160 includes an RFID controller 302, which can include hardware components, software modules, or combinations thereof, and a network interface 304. The RFID controller 302 is communicatively coupled to one or more RFID antenna(s) 104 and controls their function. For example, the RFID controller 302 can activate and deactivate the RFID antenna(s) 104 to control when the RFID antenna(s) 104 emits and receives RFID signals. The RFID controller 302 can evaluate the RFID responses received from RFID tags to aid the tag profiling system 170 in self-diagnosing unreliable RFID tags in an RFID tag area 114. In one embodiment, the RFID controller 302 evaluates signal metrics corresponding to the RFID tags such as signal strength, RSSI, or another type of received power indicator to aid the tag profiling system 170. In some embodiments, the RFID controller 302 can configure the number of read cycles performed when scanning for RFID tags and evaluate the RFID tag response count.

The RFID controller 302 is also communicatively coupled to the tag profiling system 170, e.g., via the network interface 304. The RFID controller 302 may use the network interface 304 to communicate information obtained by the RFID controller 302 regarding signal metrics and/or RFID tag response count to the tag profiling system 170. The network interface 304 may be any type of network communications interface that allows the RFID controller 302 to communicate with other computers and/or components in the system 300 via a data communications network (e.g., network 340).

The RFID reader(s) 180 includes an RFID controller 310, which can include hardware components, software modules, or combinations thereof, and a network interface 312. Similar to the RFID controller 302, the RFID controller 310 is communicatively coupled to one or more RFID antenna(s) 122 and controls their function. That is, the RFID controller 310 can activate and deactivate the RFID antenna(s) 122 to control when the RFID antenna(s) 122 emits and receives RFID signals. The RFID controller 310 can evaluate the RFID responses received from RFID tags to aid the tag profiling system 170 in determining (or predicting) at least one condition of a package having an RFID tag. In one embodiment, the RFID controller 310 evaluates signal metrics corresponding to the RFID tags such as signal strength, RSSI, or another type of received power indicator to aid the tag profiling system 170. In some embodiments, the RFID controller 310 can configure the number of read cycles performed when scanning for RFID tags and evaluate the RFID tag response count.

The RFID controller 310 is also communicatively coupled to the tag profiling system 170, e.g., via the network interface 312. The RFID controller 310 may use the network interface 312 to communicate information obtained by the RFID controller 310 regarding signal metrics and/or RFID tag response count to the tag profiling system 170. The network interface 312 may be any type of network communications interface that allows the RFID controller 310 to communicate with other computers and/or components in the system 300 via a data communications network (e.g., network 340).

The tag profiling system 170 includes processor(s) 320, a memory 330 (e.g., volatile, non-volatile, etc.), storage 350, and a network interface 360. The storage 350 may be a combination of a fixed and/or removable storage, such as fixed disc drives, removable memory cards, optical storage, network attached storage (NAS), or storage-area-network (SAN). The network interface 360 may be any type of network communications interface that allows the tag profiling system 170 to communicate with other computers and/or components in the system 300 via a data communications network (e.g., network 340). The memory 330 includes a diagnostic component 332 and a prediction component 334, each of which can include hardware and/or software components. The storage 350 includes RFID tag models 352, reference RFID tag models 354, and tag identifiers 356.

The RFID tag models 352 include the RFID tag models that are generated for each RFID tag 108 output from an RFID printer 316 in an RFID tag area 114. As noted, each RFID tag model 352 (for a RFID tag 108) may indicate the RSSI behavior of that RFID tag 108 for different distances to an RFID antenna 104 and the response rate behavior of that RFID tag 108 for different distances to an RFID antenna 104. In some embodiments, once an RFID tag 108 is discarded (e.g., the package 110 associated with the RFID tag 108 may be discarded, the RFID tag 108 is determined to be unreliable, etc.), the RFID model 352 for the RFID tag 108 can be removed from the storage 350.

In one embodiment, the reference RFID tag models 354 include the RFID tag models for different families (or types) of RFID tags. The type or family of an RFID tag 108 may correspond to a manufacturer of the RFID tag 108, a particular model (e.g., from a manufacturer) of the RFID tag 108, a particular roll associated with the RFID tag 108, capabilities of the RFID tag 108, etc. The tag profiling system 170 may determine the family of a particular RFID tag 108 based on a configuration of the RFID printer 316 (e.g., the type of RFID tags 108 being printed in a current print job). In one embodiment, the reference RFID tag models 354 may include reference RFID models that are built by the tag profiling system 170. For example, when a set of RFID tags (e.g., a roll/batch of tags) is received, the tag profiling system 170 may generate an reference RFID model to use for that set of RFID tags by evaluating parameters (e.g., RSSI, response rate, etc.) of the set of RFID tags, and determining an averaged parameter value for different distances to an RFID antenna. In this embodiment, the reference RFID tag model 354 may be generated (e.g., off-line) prior to the RFID tags being output by the RFID printer 116. The tag identifiers 356 includes the identifying information that is encoded on each RFID tag 108 (e.g., by an RFID printer 316), the association information for the RFID tag 108 (e.g., an indication of what package 110 is associated with the RFID tag 108), etc.

In one embodiment, the diagnostic component 332 monitors the RFID tag areas 114 A-K and obtain RFID tag parameters for each of the RFID tags 108 output from an RFID printer 116. For example, the diagnostic component 332 can (1) obtain an RSSI from each RFID tag 108 for each of the RFID antennas 104 and (2) obtain a response rate of each RFID tag 108 for each of the RFID antennas 104. Using these RFID parameters, the diagnostic component 332 can build a model of the RFID tag's behavior over different distances to an RFID antenna 104.

The diagnostic component 332 may determine the distances (between an RFID antenna 104 and an RFID tag 108) based on the pre-configured location (and orientation) of the RFID antenna 104 and the pre-configured location of the RFID tag area 114. When an RFID tag 108 is output from an RFID printer 116, the RFID tag 108 may be detected by the RFID antenna(s) 104 and the diagnostic component 332 can obtain RFID tag parameters for the RFID tag 108 for distances between each of the pre-configured locations of the RFID antenna(s) 104 and the pre-configured location (e.g., location 202) of the RFID printer 116 within the RFID tag area 114. Subsequently, the RFID tag 108 may be moved to a different pre-configured area (e.g., location 204) within the RFID tag area 114 where the RFID tag 108 is applied to a package 110.

The diagnostic component 332 may determine the pre-configured location where the RFID tag 108 is applied to the package 110 based on the association of the RFID tag 108 to the package 110. For example, in one embodiment, an associate may manually scan the RFID tag 108 to associate the RFID tag 108 to the current package 110 being handled by the associate. In one embodiment, once the associate requests an RFID tag 108 for a current package being handled by the associate, the diagnostic component 332 can associate the next RFID tag 108 that is output from the RFID printer 116 (or that is available to be applied to a package) to the current package. Because associates typically work in fixed locations (e.g., designated stations within a facility), the diagnostic component 332 can determine the pre-configured location where the associate will apply the next RFID tag 108 to the package, based on the association. Thus, when the RFID tag 108 is being applied to the package 110, the diagnostic component 332 can obtain RFID tag parameters for the RFID tag 108 for distances between the pre-configured locations of the RFID antenna(s) 104 and the pre-configured location (e.g., location 204) of the associate's RFID tag application station 118 within the RFID tag area 114.

In one embodiment, the diagnostic component 332 can use the generated models of the RFID tags 108 to determine, e.g., while the RFID tags 108 are in the RFID tag area 114, whether a particular RFID tag 108 should be discarded and replaced for being unreliable. For example, the diagnostic component 332 can compare the generated RFID tag model 352 for an RFID tag 108 with the reference RFID tag model 354 associated with that RFID tag 108. If the diagnostic component 332 determines that there is a significant difference (or variance) (e.g., greater than or equal to a threshold difference) between the generated RFID tag model 352 for the RFID tag 108 and the reference RFID tag model 354 for that RFID tag 108, the diagnostic component 332 can mark the RFID tag 108 for replacement.

In some embodiments, the diagnostic component 332 can mark the RFID tag 108 for replacement by generating and transmitting an electronic notification (that includes the identifier of the RFID tag 108 and the association information) to an associate. In some embodiments, the diagnostic component 332 can mark the RFID tag 108 for replacement prior to the RFID tag 108 being applied to the package 110 (e.g., based on the RFID parameters obtained when the RFID tag 108 was initially output from the RFID printer 116). In some embodiments, the diagnostic component 332 can mark the RFID tag 108 for replacement after the RFID tag 108 has been applied to a package 110 but while the RFID tag 108 is still in the RFID tag area 114. In general, the diagnostic component 332 can mark the RFID tag 108 for replacement when the RFID tag 108 is anywhere within the facility.

If the diagnostic component 332 determines that the difference between the generated RFID tag model 352 for the RFID tag 108 and the reference RFID tag model 354 for that RFID tag 108 is less than a threshold difference, the diagnostic component 332 may store the generated RFID tag model 352 for the RFID tag 108 in a storage location (e.g., storage 350) and/or send the generated RFID tag model 352 to another computing system (e.g., prediction component 334) in the inventory system 100 to aid in tracking a package 110 with the RFID tag 108. In this manner, the diagnostic component 350 can identify unreliable components in order to improve the reliability and accuracy of tracking RFID tagged packages.

In one embodiment, the prediction component 334 determines whether at least one condition of a package 110 with an RFID tag 108 has occurred, based at least in part on the generated RFID tag model 352 for the RFID tag 108. In one embodiment, the prediction component 334 may determine whether a package 110 (having an RFID tag 108) has been misplaced or lost. For example, if the prediction component 334 determines that an amount of time that has elapsed after a time when the RFID tag 108 was last detected in the RFID tag area 114 is greater than a threshold amount of time, the prediction component 334 may determine that the package 110 has been misplaced and send an alert to an associate. In another example, if the prediction component 334 determines that the package 110 is the last remaining package of a larger set of packages 110, which have been detected in the staging region 150, the prediction component 334 may determine that the package 110 has been misplaced and send an alert to an associate. In yet another example, if the prediction component 334 determines that the package 110 has not been detected at the start of a pickup window, the prediction component 334 may determine that the package 110 has been misplaced and send an alert to an associate. Otherwise, the prediction component 334 may refrain from alerting an associate. The prediction component 334 may alert an associate by generating and sending an electronic notification.

In one embodiment, the prediction component 334 may detect if a package 110 (having an RFID tag 108) has been tampered with and/or damaged since it left the RFID tag area 114. For example, the prediction component 334 may compare the generated RFID tag model 352 for the RFID tag 108 with current RFID parameters obtained from the RFID tag 108 in another location (e.g., staging region 150). If the prediction component 334 determines that the difference between the generated RFID tag model 352 for the RFID tag 108 and the current RFID parameters satisfies a predetermined condition (e.g., is greater than (or equal to) a threshold difference), the prediction component 334 may determine that the package 110 has at least been tampered with, and alert an associate (e.g., by generating and sending an electronic notification to a computing system in use by the associate).

Figure 4:
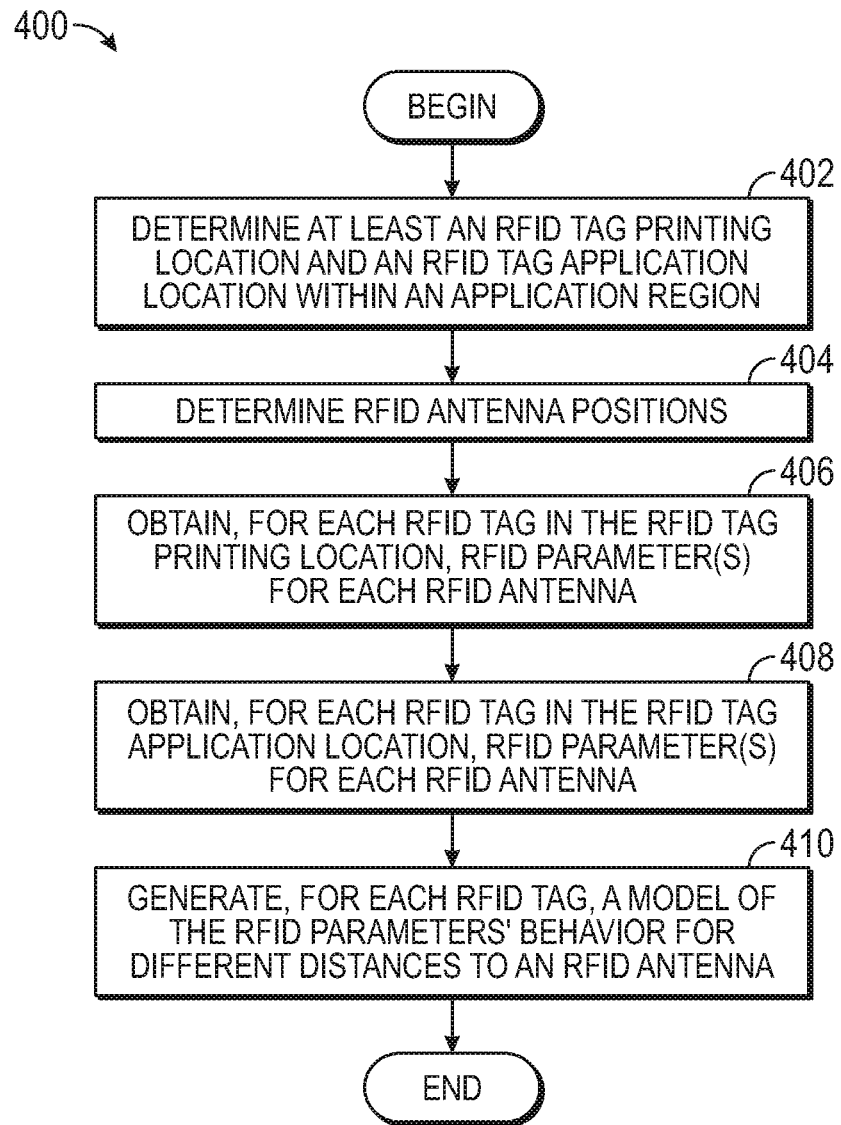
FIG. 4 is a flowchart illustrating a method for generating a model of an RFID tag in an RFID tag area, according to one embodiment.

FIG. 4 is a flowchart illustrating a method for generating an RFID tag model (e.g., RFID tag model 352) for an RFID tag (e.g., RFID tag 108) an RFID tag area (e.g., RFID tag area 114), according to one embodiment. The method 400 may be performed by one or more components of the tag profiling system 170.

The method 400 begins at block 402, where the tag profiling system 170 determines at least an RFID tag printing location (e.g., first location) and an RFID tag application location (e.g., second location) within an application region (e.g., application region 120). For example, the RFID tag printing location may correspond to a pre-configured location (e.g., location 202) of the RFID printer (e.g., RFID printer 116) in the RFID tag area and the RFID tag application location may correspond to a pre-configured location (e.g., location 204) where an RFID tag (output from the RFID printer) is applied to a package (e.g., RFID tag application station 118). As noted, the RFID tag application location may depend in part on an association between the RFID tag and a package that is being handled by an associate.

At block 404, the tag profiling system 710 determines positions of the RFID antennas (e.g., RFID antennas 104). For example, as noted, each RFID antenna may be deployed at a different location (or position) within the RFID tag area. In some cases, there may be at least one RFID antenna that is at a same distance to at least one of the RFID tag printing location and RFID tag application location as another of the RFID antennas. In some cases, each of the RFID antennas may be deployed at different distances to at least one of the RFID tag printing location and RFID tag application location. In some embodiments, an RFID antenna location may correspond to a physical position (e.g., (x, y, z) coordinate in 3D space). In some embodiments, an RFID antenna location may correspond to a simulated position (e.g., one or more attenuators can be used to attenuate an RFID signal in order to simulate an RFID antenna location).

At block 406, the tag profiling system 170 obtains, for each RFID tag in the RFID tag printing location, RFID parameters of the RFID tag for each of the plurality of RFID antennas (e.g., RFID antennas 104). In one embodiment, the RFID parameters obtained in block 406 may include an RSSI and response rate of the RFID tag for (different) distances between the pre-configured RFID antenna locations and the RFID tag printing location. In some cases, the RFID tag printing location for at least one of the RFID tags may be different from the RFID tag printing location of another one of the RFID tags. For example, different RFID tags may be output from different RFID printers in different locations. The tag profiling system 170 may determine the particular RFID printer location associated with an RFID tag based on the identifying information (indicating the RFID printer) obtained from the RFID tag via the RFID antennas.

At block 408, the tag profiling system 170 obtains, for each RFID tag in a RFID tag application location, RFID parameters of the RFID tag for each of the plurality of RFID antennas. In one embodiment, the RFID parameters obtained in block 408 may include an RSSI and response rate of the RFID tag for (different) distances between the pre-configured RFID antenna locations and the RFID tag application location. In some cases, the RFID tag application location for at least one of the RFID tags may be different from the RFID tag application location of another one of the RFID tags. For example, a first RFID tag may be associated with a package being handled by a first associate located in a first RFID tag application station (e.g., RFID tag application station 118) and a second RFID tag may be associated with a package being handled by a second associated located in a second RFID tag application station.

At block 410, the tag profiling system 170 generates, for each RFID tag, a model of the RFID parameters' behavior for different distances to an RFID antenna. As noted, based on the RFID parameter information obtained from each of the RFID antennas, the tag profiling system 170 can fit a curve to the obtained data to determine how the RFID parameters change (or vary) at various distances to an RFID antenna. In one embodiment, generating the model for each RFID tag may involve using linear and/or non-linear regression analysis techniques to find the best curve that fits the data. In other embodiments, other curve-fitting techniques can be used to generate the model for each RFID tag.

Figure 5:
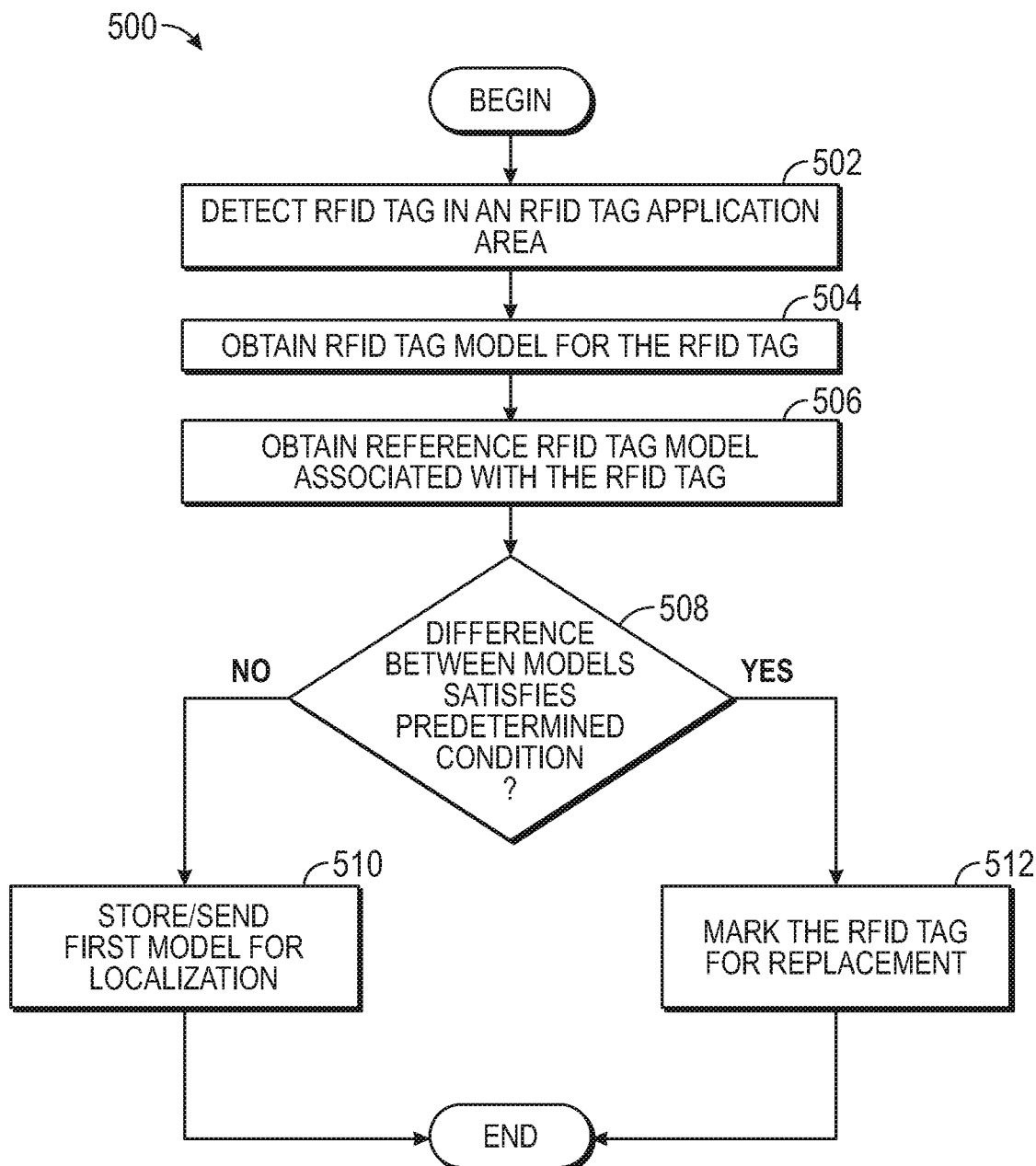
FIG. 5 is a flowchart illustrating a method for self-diagnosing unreliable RFID tags in an RFID tag area, according to one embodiment.

FIG. 5 is a flowchart illustrating a method for self-diagnosing unreliable RFID tags, according to one embodiment. The method 500 may be performed by one or more components of the tag profiling system 170.

The method 500 begins at block 502, where the tag profiling system 170 detects an RFID tag (e.g., RFID tag 108) in an RFID tag area (e.g., RFID tag area 114). In one embodiment, the tag profiling system 170 may detect the RFID tag when the RFID tag is initially output from the RFID printer (e.g., RFID printer 116). In one embodiment, the tag profiling system 170 may detect the RFID tag when the RFID tag is being applied to a package (e.g., RFID tag application station 118). At block 504, the tag profiling system 170 obtains a first model (e.g., RFID tag model 352) of RFID parameters for the RFID tag. At block 506, the tag profiling system 170 obtains a second model of RFID parameters associated with the RFID tag (e.g., reference RFID tag model 354).

At block 508, the tag profiling system 170 determines whether the difference between the first and second models satisfies a predetermined condition (e.g., is greater than a threshold). If the difference satisfies the predetermined condition, the tag profiling system 170 marks the RFID tag for replacement (block 512). If the difference does not satisfy the predetermined condition (e.g., the difference is less than the threshold), the tag profiling system 170 stores and/or sends the first model to another computing system to aid in performing localization of a package having the RFID tag (block 510).

Figure 6:
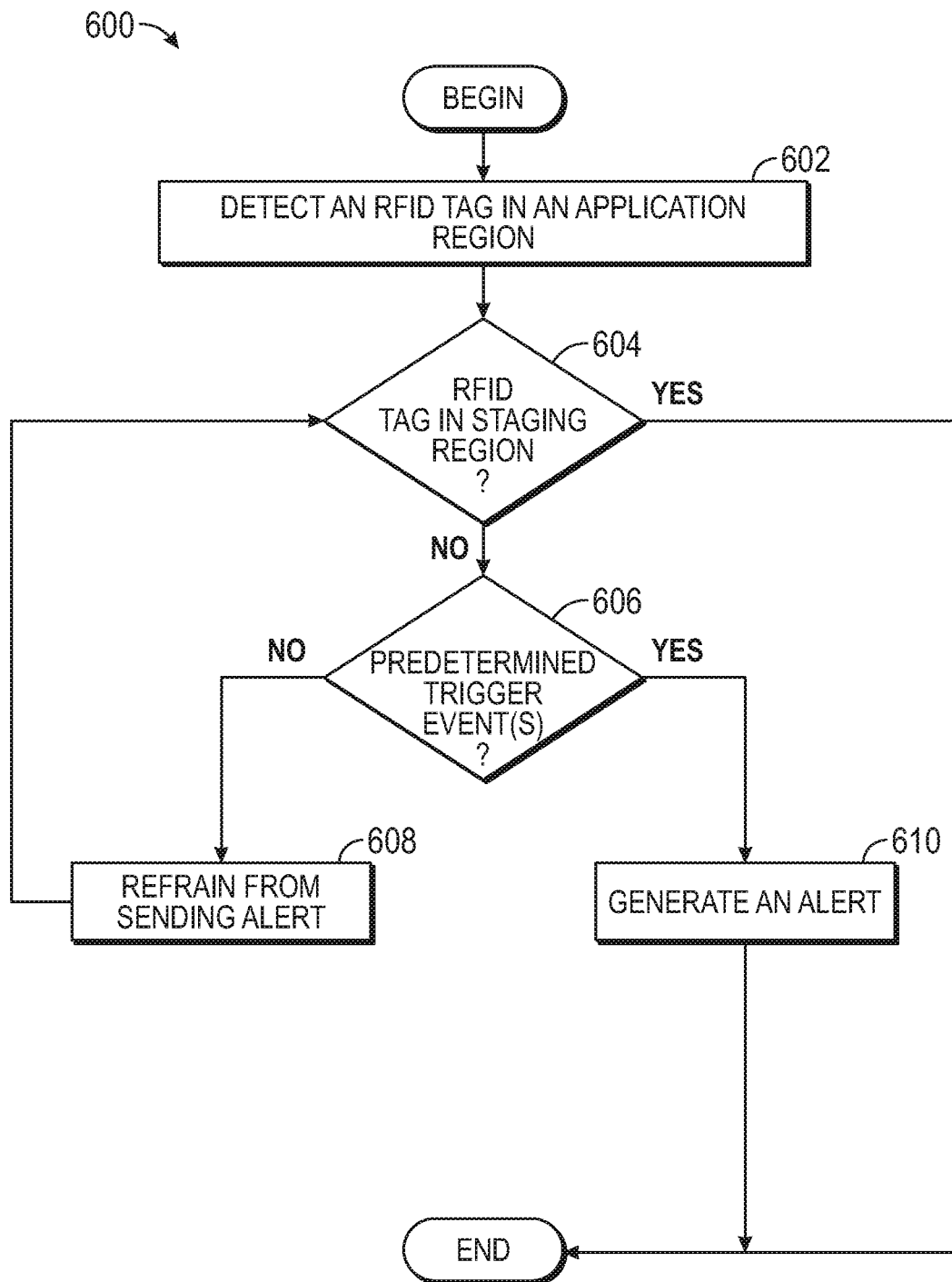
FIG. 6 is a flowchart illustrating a method for self-diagnosing misplaced RFID tagged packages, according to one embodiment.

FIG. 6 is a flowchart illustrating a method for self-diagnosing misplaced RFID tagged packages, according to one embodiment. The method 600 may be performed by one or more components of the tag profiling system 170.

The method 600 begins at block 602, where the tag profiling system 170 detects an RFID tag (e.g., RFID tag 108) in an application region (e.g., application region 120). In one embodiment, the tag profiling system may determine a time instance corresponding to a time when an RFID tag was last detected in the application region. In one embodiment, the application region may correspond to an RFID tag area (e.g., RFID tag area 114). The time instance may correspond to a time after the RFID tag has been applied to a package (e.g., package 110).

At block 604, the tag profiling system 170 determines whether the RFID tag has been detected in a staging region (e.g., staging region 150). For example, the tag profiling system 170 may determine whether the RFID tag has been detected in a staging location/area (e.g., staging area 124 within staging region 150). In one embodiment, the tag profiling system 170 may obtain indications of RFID tags that have been detected in the staging region 150 from the RFID readers 180/RFID antennas 122 deployed in the staging region 150. If the tag profiling system 170 determines the RFID tag has been detected, the method ends.

On the other hand, if the tag profiling system 170 determines the RFID tag has not been detected, the tag profiling system 170 determines whether one or more predetermined trigger events have been detected (block 606). The trigger event(s) may include at least one of an elapsed amount of time satisfying a predetermined condition (e.g., greater than (or equal to) a threshold), an indication of whether the RFID tag is associated with a package from a set of packages, an indication that a start time for a pickup window has occurred, etc. In one reference example, the tag profiling system 170 may determine a trigger event has occurred if the RFID tag is associated with a last package of a set of packages that have been detected in the staging region. In another reference example, the tag profiling system 170 may determine a trigger event has occurred if a time corresponding to a start of a pickup window has passed and the RFID tag has not been detected in the staging region.

If the predetermined trigger event(s) is detected, the tag profiling system 170 generates an alert (e.g., by generating and sending an electronic notification) to notify an associate (block 610). If the predetermined trigger event(s) is not detected, the tag profiling system 170 refrains from sending an alert (block 608) and the method proceeds to block 604.

Figure 7:
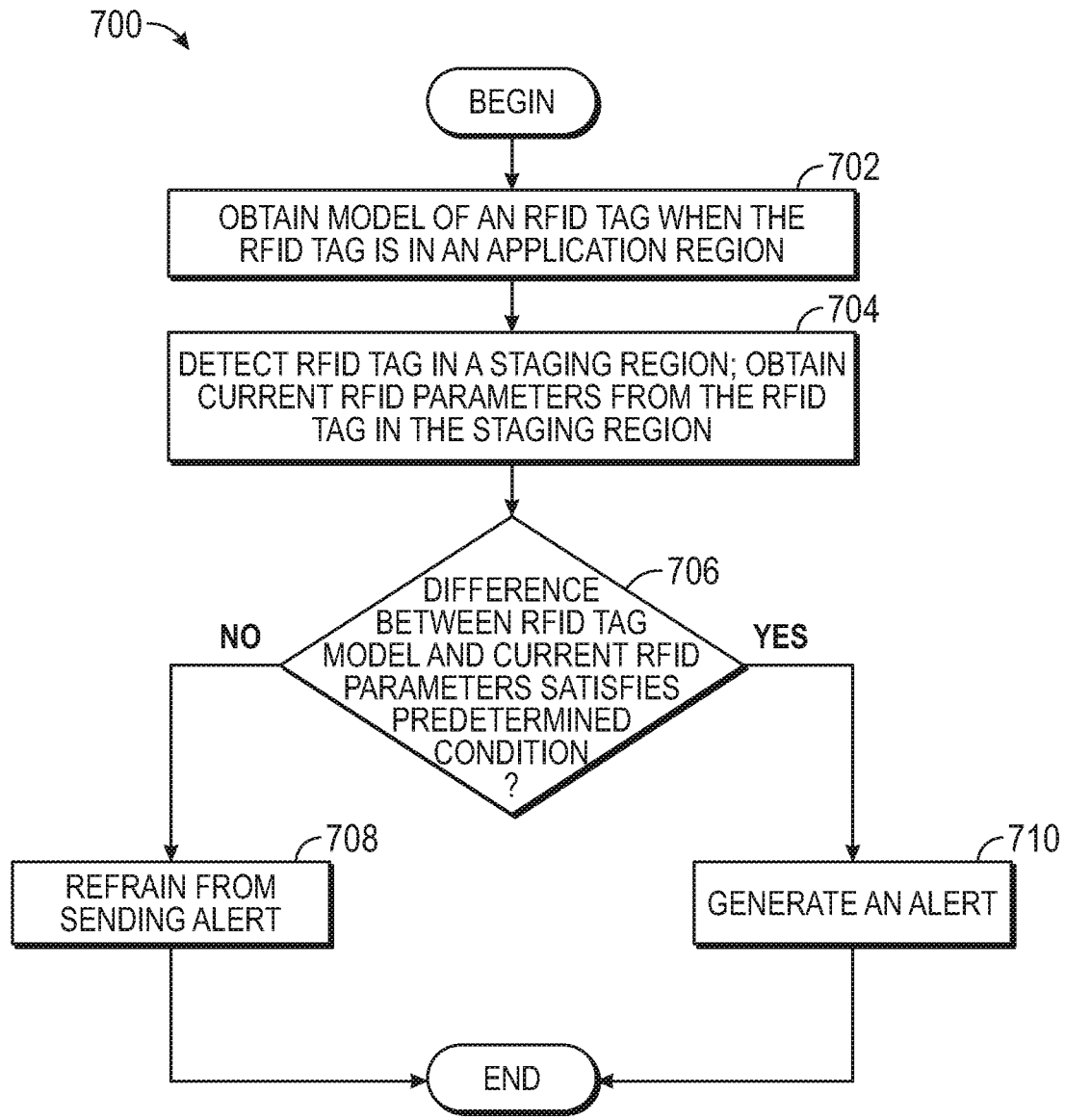
FIG. 7 is a flowchart illustrating a method for self-diagnosing tampered or damaged RFID tagged packages, according to one embodiment.

FIG. 7 is a flowchart illustrating a method for determining whether a package having an RFID tag has been tampered with and/or damaged, according to one embodiment. The method 700 may be performed by one or more components of the tag profiling system 170.

The method 700 begins at block 702, where the tag profiling system 170 obtains an RFID model of an RFID tag when the RFID tag is in an application region (e.g., application region 120). In one embodiment, the RFID tag may be within an RFID tag area (e.g., RFID tag area 114) within the application region. At block 704, the tag profiling system 170 detects an RFID tag in a staging region (e.g., staging region 150) and obtains current RFID parameters from the RFID tag in the staging region (e.g., via RFID reader(s) 180 and RFID antenna(s) 122). At block 706, the tag profiling system 170 determines whether the difference between the RFID tag model and the current RFID parameters satisfies a predetermined condition (e.g., is greater than or equal to a threshold). For example, in some embodiments, the tag profiling system 170 may determine that the package has been tampered with if the current RFID parameters can't be detected. If the predetermined condition at block 706 is satisfied, the tag profiling system 170 generates an alert indicating to an associate that the package with the RFID tag has been at least tampered with (block 710). For example, the alert may indicate physical damage, theft, etc. If not, the tag profiling system 170 refrains from sending the alert (block 708).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system, comprising:
a radio frequency identification (RFID) printer configured to output an RFID tag in a first location within an environment;
an RFID reader;
at least one processor; and
a memory storing one or more applications, which, when executed by the at least one processor, performs an operation comprising:
obtaining, via the RFID reader, for the RFID tag, a first set of RFID parameters for each of a plurality of RFID antenna positions; and
generating, for the RFID tag, a first model of RFID tag behavior over different distances to an RFID antenna, based at least in part on the first set of RFID parameters obtained for the RFID tag.

2. The system of claim 1, further comprising an RFID antenna coupled to the RFID reader, wherein the plurality of RFID antenna positions are generated via the RFID antenna coupled to the RFID reader.

3. The system of claim 1, further comprising at least one RFID tag application station disposed in a second location within the environment, wherein the operation further comprises obtaining, via the RFID reader, for the RFID tag, a second set of RFID parameters for each of the plurality of RFID antenna positions when the RFID tag is in the second location.

4. The system of claim 3, wherein the first model of RFID tag behavior for the RFID tag is further generated based at least in part on the second set of RFID parameters obtained for the RFID tag.

5. The system of claim 1, the operation further comprising determining, for the RFID tag, a second model of RFID tag behavior over different distances to an RFID antenna.

6. The system of claim 5, the operation further comprising upon determining, for the RFID tag, that a difference between the first model of RFID tag behavior for the RFID tag and the second model of RFID tag behavior for the RFID tag satisfies a predetermined condition, transmitting the first model of RFID tag behavior for the RFID tag to a computing system.

7. The system of claim 5, the operation further comprising upon determining, for the RFID tag, that a difference between the first model of RFID tag behavior for the RFID tag and the second model of RFID tag behavior for the RFID tag satisfies a predetermined condition, marking the RFID tag for replacement.

8. A computer-implemented method comprising,
outputting, via a radio frequency identification (RFID) printer, an RFID tag in a first location within an environment;
obtaining, for the RFID tag, a first set of RFID parameters for each of a plurality of RFID antenna positions; and
generating, for the RFID tag, a first model of RFID tag behavior over different distances to an RFID antenna, based at least in part on the first set of RFID parameters obtained for the RFID tag.

9. The computer-implemented method of claim 8, wherein the plurality of RFID antenna positions are generated via a single RFID antenna.

10. The computer-implemented method of claim 8, further comprising obtaining, for the RFID tag, a second set of RFID parameters for each of the plurality of RFID antenna positions when the RFID tag is in a second location within the environment.

11. The computer-implemented method of claim 10, wherein the first model of RFID tag behavior for the RFID tag is further generated based at least in part on the second set of RFID parameters obtained for the RFID tag.

12. The computer-implemented method of claim 8, further comprising determining, for the RFID tag, a second model of RFID tag behavior over different distances to an RFID antenna.

13. The computer-implemented method of claim 12, further comprising upon determining, for the RFID tag, that a difference between the first model of RFID tag behavior for the RFID tag and the second model of RFID tag behavior for the RFID tag satisfies a predetermined condition, transmitting the first model of RFID tag behavior for the RFID tag to a computing system.

14. The computer-implemented method of claim 12, further comprising upon determining, for the RFID tag, that a difference between the first model of RFID tag behavior for the RFID tag and the second model of RFID tag behavior for the RFID tag satisfies a predetermined condition, marking the RFID tag for replacement.

15. A non-transitory computer-readable storage medium storing instructions, which, when executed on a computing system, perform an operation comprising:
outputting, via a radio frequency identification (RFID) printer, an RFID tag in a first location within an environment;
obtaining, for the RFID tag, a first set of RFID parameters for each of a plurality of RFID antenna positions; and
generating, for the RFID tag, a first model of RFID tag behavior over different distances to an RFID antenna, based at least in part on the first set of RFID parameters obtained for the RFID tag.

16. The non-transitory computer-readable storage medium of claim 15, wherein the plurality of RFID antenna positions are generated via a single RFID antenna.

17. The non-transitory computer-readable storage medium of claim 15, the operation further comprising obtaining, for the RFID tag, a second set of RFID parameters for each of the plurality of RFID antenna positions when the RFID tag is in a second location within the environment, wherein the first model of RFID tag behavior for the RFID tag is further generated based at least in part on the second set of RFID parameters obtained for the RFID tag.

18. The non-transitory computer-readable storage medium of claim 15, the operation further comprising determining, for the RFID tag, a second model of RFID tag behavior over different distances to an RFID antenna.

19. The non-transitory computer-readable storage medium of claim 18, the operation further comprising upon determining, for the RFID tag, that a difference between the first model of RFID tag behavior for the RFID tag and the second model of RFID tag behavior for the RFID tag satisfies a predetermined condition, transmitting the first model of RFID tag behavior for the RFID tag to a computing system.

20. The non-transitory computer-readable storage medium of claim 18, the operation further comprising upon determining, for the RFID tag, that a difference between the first model of RFID tag behavior for the RFID tag and the second model of RFID tag behavior for the RFID tag satisfies a predetermined condition, marking the RFID tag for replacement.

* * * * *